(No Model.)
W. B. CARPENTER.
PLASTIC EYELET.
No. 271,035.  Patented Jan. 23, 1883.
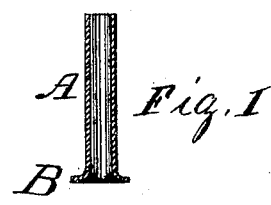
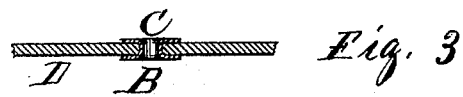
Witnesses
R. F. Steadman
Jr. C. Bristol
Inventor
William B. Carpenter
By Horace Harris

United States Patent Office.

WILLIAM B. CARPENTER, OF NEWARK, NEW JERSEY.

PLASTIC EYELET.

SPECIFICATION forming part of Letters Patent No. 271,035, dated January 23, 1883.

Application filed June 12, 1882. (No model.)

*To all whom it may concern:*

Be it known that I, WILLIAM B. CARPENTER, of Newark, in the county of Essex and State of New Jersey, have invented a new and useful Improvement in Plastic Eyelets, of which the following is a specification.

My invention relates to the manufacture of eyelets from celluloid, lignoid, or other pyroxyline or like plastic material; and it consists in the order substantially as hereinafter set forth.

Figure 1 shows a tube, A, of celluloid, &c., having one end flanged. Fig. 2 shows the flanged end cut off from the tube, making the eyelet as prepared for the market. The same shows the form of the eyelet if molded. Fig. 3 shows an eyelet when attached to the goods.

In making eyelets of celluloid or other like plastic stock I take the tubes A, of the size required, that have been made of the material by any well-known process of making such tubes, and place one end in any suitable former, where it is softened by warming or otherwise, and turn over the end forming the flange B, thus making one end of the eyelet. This end, with proper length of tubes, is then cut off, as seen in Fig. 2, and is in merchantable shape.

These eyelets may be in a great variety of colors, according to the place they are to occupy, to harmonize with the color of goods.

In setting these eyelets, as seen in Fig. 3, by some suitable means, the end C will be softened either by using a tool that is warm, or by having had them in some warm place, or otherwise, when the end C may be flanged and set down on the goods D, the same as in metal, and in a moment they will be hard.

In addition, when the eyelets have been set, they may be touched on each side at the point of their contact with the goods with a liquid-celluloid cement, which will at once and firmly unite them with the goods, making them as a part thereof.

Instead of being formed from the tubes, these eyelets may be molded and answer the same purpose.

I claim—

As a new article of manufacture, a tubular eyelet made from celluloid or other pyroxyline or like plastic material, substantially as and for the purpose specified.

WILLIAM B. CARPENTER.

Witnesses:
HORACE HARRIS,
R. S. STEADMAN.